(12) United States Patent
Horton

(10) Patent No.: US 7,794,626 B2
(45) Date of Patent: Sep. 14, 2010

(54) CATHODIC PROTECTION COMPOUNDS

(75) Inventor: Stephen D. Horton, Avon, OH (US)

(73) Assignee: PolyOne Corporation, Avon Lake, OH (US)

( * ) Notice: Subject to any disclaimer, the term of this patent is extended or adjusted under 35 U.S.C. 154(b) by 406 days.

(21) Appl. No.: 10/597,621

(22) PCT Filed: Feb. 1, 2005

(86) PCT No.: PCT/US2005/002878

§ 371 (c)(1),
(2), (4) Date: Jul. 14, 2008

(87) PCT Pub. No.: WO2005/078158

PCT Pub. Date: Aug. 25, 2005

(65) Prior Publication Data

US 2008/0265217 A1     Oct. 30, 2008

Related U.S. Application Data

(60) Provisional application No. 60/541,564, filed on Feb. 4, 2004.

(51) Int. Cl.
*H01B 1/22* (2006.01)
*H01B 1/02* (2006.01)
*B05D 3/12* (2006.01)

(52) U.S. Cl. .................. 252/500; 252/503; 252/512; 427/327; 427/328

(58) Field of Classification Search ............. 252/503, 252/512; 427/327, 328
See application file for complete search history.

(56) References Cited

U.S. PATENT DOCUMENTS

| 3,562,124 A | | 2/1971 | Leon et al. | |
| 3,998,779 A | | 12/1976 | Baer et al. | |
| 5,700,398 A | | 12/1997 | Angelopoulos et al. | |
| 5,750,249 A | | 5/1998 | Walther et al. | |
| 5,968,417 A | | 10/1999 | Viswanathan | |
| 5,976,419 A | * | 11/1999 | Hawkins et al. | 252/512 |
| 6,402,933 B1 | | 6/2002 | Dowling | |
| 6,440,332 B1 | * | 8/2002 | Geer et al. | 252/512 |
| 6,562,201 B2 | | 5/2003 | Dowling | |
| 6,627,117 B2 | | 9/2003 | Geer et al. | |
| 6,632,380 B1 | * | 10/2003 | Wessling | 252/500 |
| 2005/0070657 A1 | * | 3/2005 | Elkovitch et al. | 524/495 |

* cited by examiner

*Primary Examiner*—Mark Kopec
*Assistant Examiner*—Jaison P Thomas
(74) *Attorney, Agent, or Firm*—John H. Hornickel

(57) ABSTRACT

A cathodic protection compound is disclosed. The coating includes sacrificial metallic particles less noble than metal in the metal substrate to be protected. The coating also includes inherently conductive polymer in an amount of less than 1 weight percent of total solids of the coating. A concentrate of the metallic particles and inherently conductive polymer can also be prepared.

11 Claims, 4 Drawing Sheets

Fig. 1
(Prior Art)
Fig. 2
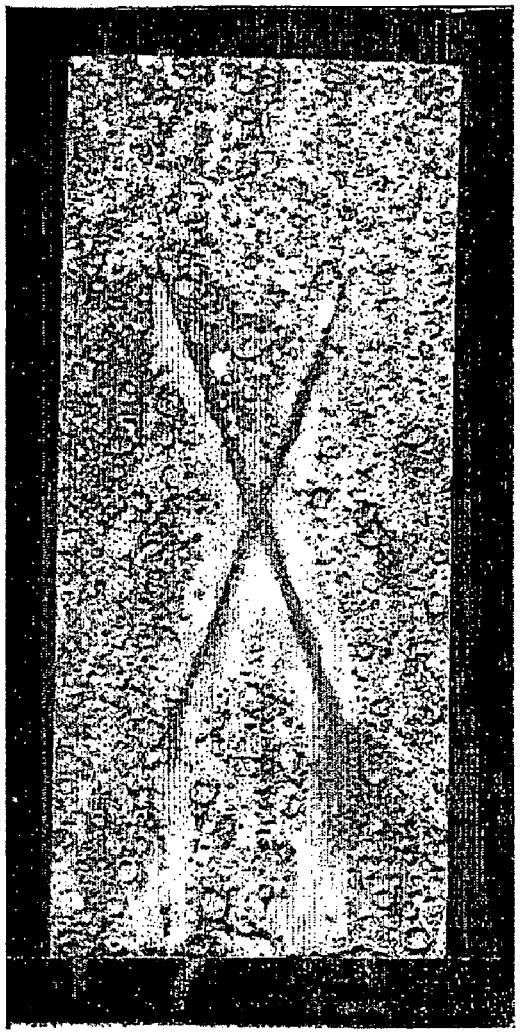
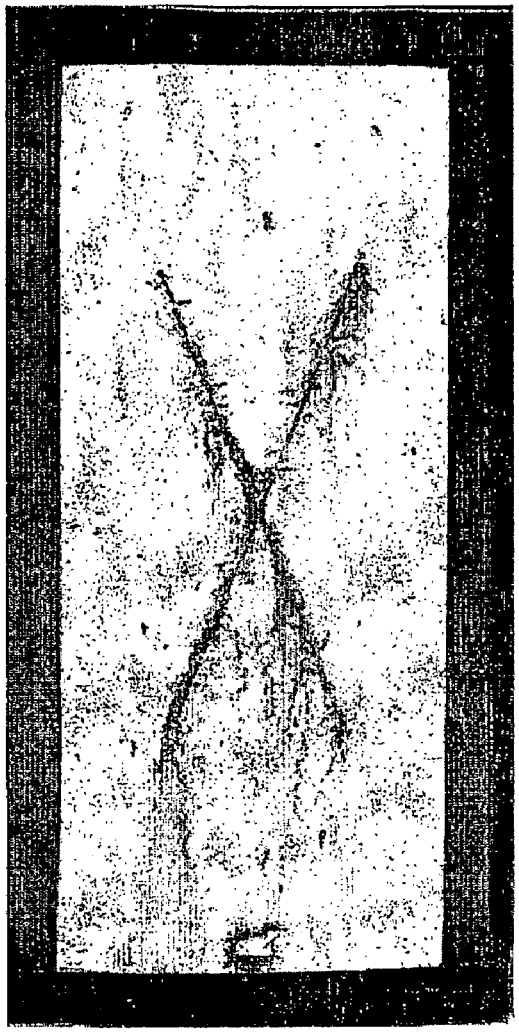

Fig. 5
Fig. 6
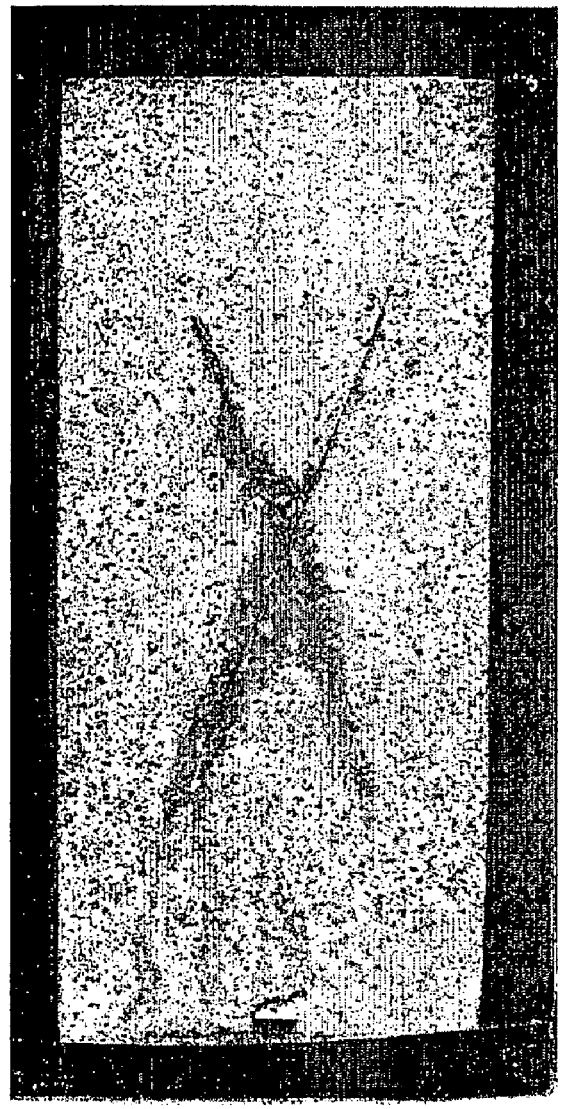

CATHODIC PROTECTION COMPOUNDS

CLAIM OF PRIORITY

This application claims priority from U.S. Provisional Patent Application Ser. No. 60/541,564 and filed on Feb. 4, 2004.

FIELD OF THE INVENTION

This invention relates to cathodic protection compounds containing inherently conductive polymer (ICP) and sacrificial anodic metal particles.

BACKGROUND OF THE INVENTION

In modern society, over the past fifty years, there has been a shift from metals to polymers, partly because the latter do not oxidize in the environment. For example, corrosion of metal destroys valuable property. Corrosion is the inevitable reaction of metal to form metal oxide when the metal is exposed to environmental conditions that permit such corrosion. Billions of dollars are spent each year to repair or replace metallic structures because of such corrosion.

The corrosion of iron-containing articles, the natural process normally called "rusting", has prompted considerable effort to find effective, economical ways to prevent or reduce rust. Coating the surface of the iron-containing article, the process of painting, was first attempted to shield the article from the elements needed for the natural rusting reaction to begin.

Iron-containing articles form the structures that have erected the cities and commercial links between them. Ironwork, for such diverse uses as multi-story buildings, suspension bridges, tunnels beneath a mountain or a river, high tension utility powerlines, fuel storage tanks, the Statue of Liberty, the Eiffel Tower, and reinforcement grids for concrete structures of all types, all require such protection from corrosion.

Anti-corrosion mechanisms have taken advantage of the Galvanic Series, whereby a less noble metal is a sacrificed in the environment where the iron would otherwise rust. This "cathodic protection" of metal has spawned an enormous industry dedicated to preserving metallic property against the ravages of the environment.

Cathodic protection utilizes the physics of a galvanic circuit, which can be assisted by power to be an active circuit to drive the corroding effects away from the metal being protected or which can be passive without power. Examples of passive galvanic circuitry are disclosed in U.S. Pat. No. 5,650,060 (Huang et al.) for an electrode-based system and in U.S. Pat. No. 5,976,419 (Hawkins et al.) for a coating-based system. Both types of systems rely on a more anodic metal in the Galvanic Series, such as zinc, to protect the more valuable iron in the structure. In the Huang et al. electrode, the zinc is in the form of plate adhered by an ionically conductive adhesive to a structure. In the Hawkins et al. coating, the zinc is in the form of particles dispersed in the binder and inherently conductive polymer. In both cases, the zinc is the anode of the galvanic circuit. The anodic zinc is sacrificed to preserve the cathodic iron.

U.S. Pat. No. 5,700,398 (Angelopoulos et al.) discloses a composition comprising polymeric matrix with a conductive filler comprising electrically conductive particles and a conducting polymer, such as a substituted polyaniline, wherein the amount of conducting polymer can be as low as 0.3 weight percent of the total polymeric matrix. But the electrically conductive particles are disclosed to be no less than about 40% by weight of the total polymeric matrix. Thus, by calculation, the electrically conductive particles are no less than about 28% by weight of the composition.

The combination of inherently conductive polymer with sacrificial metal particles becomes a cathodic protection coating to protect metal substrates in which the metal particles are less noble than the metal of the substrate. Such cathodic protection coating is disclosed in U.S. Pat. Nos. 6,440,332 and 6,627,117 (both Geer et al.). Such cathodic protection coating is marketed by PolyOne Corporation under the brand Catize® coating. As disclosed in U.S. Pat. No. 6,440,332, the amount of inherently conductive polymer is from approximately 1% to 40% by weight of the coating system and the amount of metal particles is from approximately 5% to 50% by weight of the coating system.

Japanese Patent Publication 8-277370 discloses a primer for general offshore structures, wherein the amount of the organic resin is 20 to 50 parts by weight, the amount of the metal particles (less electropositive than iron) is 60 to 90 parts by weight, and the amount of electroconductive polymer is 0.1 to 10 parts by weight.

The ingredients of a cathodic protection coating are expensive, especially the inherently conductive polymer.

SUMMARY OF THE INVENTION

What the art needs is a cathodic protection compound that maintains an effective amount of cathodic protection with a minimum amount of ingredients. What the art also needs is a minimum effective amount of inherently conductive polymer with an effective amount of sacrificial metal particles.

The present invention solves that problem by providing a cathodic protection compound that maintains, even improves cathodic protection with a minor amount of inherently conductive polymer.

One aspect of the present invention is a cathodic protection compound to protect a metal substrate, comprising: (a) inherently conductive polymer; (b) metal particles wherein the metal is less noble than metal of the metal substrate; and (c) binder, wherein the amount of inherently conductive polymer is less than 1 weight percent of total solids of the compound and wherein the amount of metal particles is less than 20 percent of the total solids of the compound.

None of the prior art discussed above disclose a cathodic protection compound with the combination of less than 1 weight percent of inherently conductive polymer and less than 20 weight percent of metal particles.

Preferably, the amount of inherently conductive polymer ranges from an electrically effective amount to less than 0.8 weight percent of total solids of the compound. More preferably, the amount of inherently conductive polymer ranges from 0.14 weight percent to 0.5 weight percent of total solids of the compound.

"Electrically effective amount" means the minimum concentration of inherently conductive polymer to maintain sufficient electrically conductivity to maintain a galvanic circuit useful for cathodic protection in which the metal in the metal substrate is the cathode and the metal particles in the coating are the sacrificial anodes.

The binder, and hence the compound, is desirably in the form of a flowable material. However, considering the goal of the minimum effective amount of inherently conductive polymer with an effective amount of sacrificial metal particles, one must use the weight percent total solids of the compound that has binder, inherently conductive polymer, and metal particles, all three of which ingredients are solid. Therefore, one needs to discount the weight of volatile or evaporative carriers in the flowable material that does not remain as a part of the compound after drying or curing on the surface of a metal substrate.

"Flowable material" can be (a) a film-forming liquid, such as a paint or other coating, to be sprayed or brushed on to a metal-containing article needing cathodic protection;

(b) an amorphous solid, such as a polymeric adhesive or other polymer, to be formed as a layer on the metal-containing article;

(c) a powder to be applied to form a coating on the metal-containing article; or (d) a vapor, such as a superheated gas that coalesces on the metal-containing article.

Preferably, the flowable material is a polymeric binder capable of rapidly and inexpensively forming a film or other coating on the metal-containing article to be cathodically protected. The flowable material need not itself be electrically conductive if the selection of flowable material is made less expensive as a result.

More preferably, the flowable material is capable of forming a barrier in the same manner as any paint or other coating does to provide a physical aspect of protection of the metal-containing article to be cathodically protected.

Another aspect of the present invention is a method of using a cathodic protection compound for a metal substrate, comprising the steps of (a) selecting a cathodic protection compound of the present invention wherein the metal particles are less noble than metal of the metal substrate, and (b) applying the cathodic protection compound to the metal substrate.

Another aspect of the present invention is a metal substrate protected cathodically by a cathodic protection compound of the present invention.

A feature of the invention is the use of less than 1 weight percent of inherently conductive polymer and less than 20 weight percent of sacrificial metal particles in the total solids of the cathodic protection compound.

These and other unexpected features and advantages of the invention are discussed in greater detail below, in conjunction with the images described below.

BRIEF DESCRIPTION OF THE DRAWINGS

FIG. 1 a digital image of a sample of Comparison Example A.

FIG. 2 a digital image of a sample of Example 1.

FIG. 5 a digital image of a sample of Example 3.

FIG. 6 a digital image of a sample of Comparison Example C.

EMBODIMENTS OF THE INVENTION

Metal Particles

Figure 3:
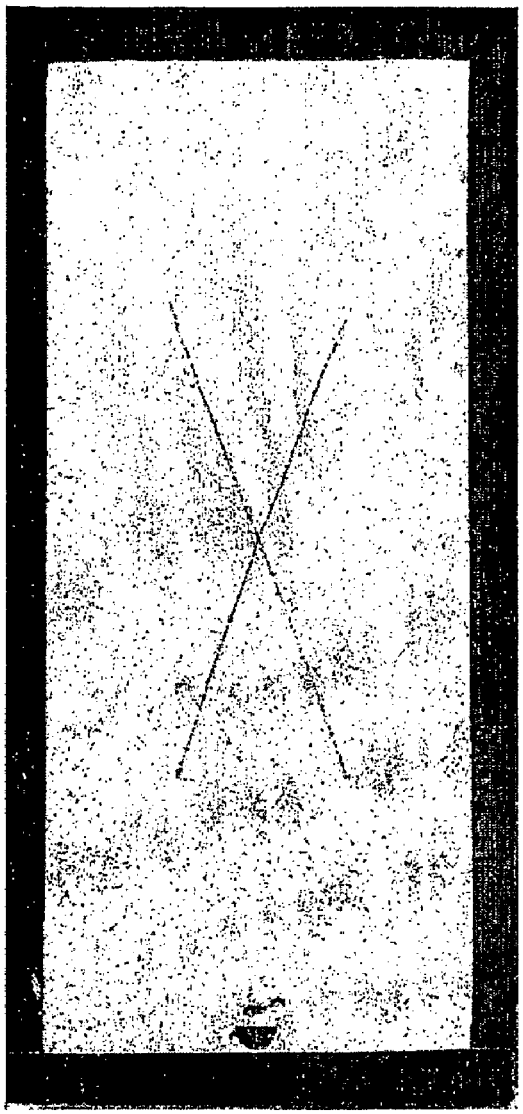
FIG. 3 a digital image of a sample of Example 2.

If the metal particles are to protect some other metal which is in electrical communication with the cathodic protection film or coating, then the metal chosen to be generated needs to be more anodic (less noble) than the metal to be protected, according to the Galvanic Series. Such concept is disclosed in U.S. Pat. No. 5,976,419 (Hawkins et al.), from which the two Geer et al. patents claim priority.

Average particle size can range from about 1 µm to about 25 µm, and preferably from about 2 to about 10 µm, and most preferably about 2 µm.

Metal particle shape is also a parameter. Particle shapes can range from spheres to platelets. Generally, the larger surface area per unit volume is preferable. However, one skilled in the art must also take into consideration the difficulties of processing high aspect ratio platelets compared with low aspect ratio spheres.

While not preferred, particles of metal can aggregate or agglomerate within the polymer, without departing from the scope of the present invention.

The sacrificial anodic metal particles reside in the flowable material, preferably intimately intermixed in, or co-continuous with, a flowable material that can be easily made contiguous to the cathodic metal to be protected.

The selection of the sacrificial anode is determined by the cathodic metal to be protected and then influenced by cost, availability, ease of handling, environmental impact, and other factors. The determination of metal candidates is founded in the Galvanic Series, which establishes the continuum of metallic performance. So long as the anode metal is higher or more anodic within the Galvanic Series than the cathodic metal, then it is a candidate.

The Galvanic Series is well-known to electro-chemists and can be employed without undue experimentation to select a suitable candidate for sacrificial anodic use. One location to examine the choices of candidates is www.corrosionsource.com. Another location based on Military Specifications is www.eaa1000.av.org/technicl/corrosion/galvanic.htm which identifies alloys of metals as well as pure metals in the Corrosion Control—Galvanic Table.

Non-limiting examples of common sacrificial anodes relative to cathodic metals to be protected are seen in Table 1.

TABLE 1

| Cathodic Metal to be Protected | Sacrificial Anodic Metal |
|---|---|
| Iron | Zinc, Aluminum, Tin |
| Copper | Iron + Those to Protect Iron |
| Nickel | Copper + Those to Protect Copper |
| Titanium | Nickel + Those to Protect Nickel |
| Silver | Titanium + Those to Protect Titanium |

Of the various possible metals, transition metals are preferred because such metals have low ionization energies, positive oxidation states, high melting points, high boiling points, high electrical conductivity, malleability, and other desirable properties.

The amount of anodic metal within the compound can range from about 0.1% to about 20%, and preferably from about 5% to about 20%. All percents are weight percents to the total solids of the total compound. The amount of anodic metal to be included should exceed the anticipated duration of galvanic protection, taking into account the rate of consumption of the metal as the sacrificial anode. It is possible for one skilled in the art to make computations to determine a preferred amount of anodic metal loading into the flowable material. However, one should not overload the compound with anodic metal that will exceed the useful life of the cathodic metal to be protected.

Metal particles can be any element less noble than the metal to be protected. Preferably, the metal particles are zinc because of lower cost than other metals and because zinc is less noble than iron, the metal most often protected by cathodic protection systems. Alternatively, one can use aluminum in circumstances where there is concern about the use of zinc in the environment. As the Military Specification Galvanic Table indicates, there are many suitable alloys of aluminum and another metal suitable for corrosion control.

Zinc particles are commercially available from such sources as Purity Zinc Metals LLC of Clarksville, Tenn.; Humel Croton, Inc.; and Trident Alloys, Ltd. Aluminum particles are commercially available from Eckart, Inc.

Flowable Material

The flowable material can be electrically active or inactive. An electrically inactive flowable material is more cost effective with at least an electrically effective amount of inherently conductive polymer according to the present invention. However, it may be desirable in some embodiments to assist the conductive media by having the flowable material to also be electrically active to improve electron transfer in the galvanic circuit in which the metal substrate to be protected is the cathode and the metal particles intermixed with the conductive media in the flowable material are the sacrificial anodes.

Non-limiting examples of electrically inactive flowable materials are any polymer capable of forming a film or coating or a molded or extruded product, such as polymers from olefins, acrylics, epoxies, urethanes, alkyds, uv-curable or electron-beam curable acrylates, polyvinyl chloride, polyester, polyvinyl alcohol, ethylene vinyl acetate, ionomers of ethylene acrylic acid, fluoropolymers, polymers of silicone, phenolic resins, melamine, polyamide, natural and synthetic rubbers, styrenic block copolymers, polystyrene sulfonic acid, polyacrylamide, polyvinyloxazoline, and polyethylenimine.

"Polymers" means naturally-occurring polymers, synthetically-produced polymers, combinations of naturally-occurring polymers and synthetically-produced polymers by physical or chemical interaction, or combinations thereof.

All principal forms of polymer physics are acceptable for use in the present invention: thermoplastic plastics, thermoplastic elastomers, thermoset plastics, thermoset elastomers, and the mixtures of them within such four corners of polymer physics. Thermoplastics are preferred for ease of formulation and application, but thermoset plastics are preferred for performance results. A non-limiting list of acceptable polymer chemistries can be found at www.PolyOne.com.

The polymer can be adhesive or non-adhesive. Its adhesive can be naturally occurring or generated by plasticizing and tackifying agents. A non-limiting list of acceptable adhesives can be found at www.3M.com.

The common denominator to the choice of polymer is that it be capable of serving as a binder or carrier for the combination of inherently conductive polymer and metal particles therein.

Commercially available thermoplastic and thermoset polymers include commercial paints and other film-forming compounds, including without limitation, Valspar® brand paints and coating from Valspar of Minneapolis, Minn. USA; products of Sherwin-Williams of Cleveland, Ohio USA, and Rustoleum® brand paints and coatings from RPM Industries of Medina, Ohio USA.

Electrically active flowable materials are also suitable in the present invention by including as an optional ingredient electrically active, galvanically inactive materials such as carbon fibers, particles, and nanotubes in an amount effective to enhance electrically conductivity while not interfering with the galvanic circuit used to cathodically protect the metal substrate.

The optional carbon fibers, particles, or nanotubes can be present in an amount of from 0 to about 10 weight percent of total solids of the flowable material.

Of possible candidates, carbon fibers and nanotubes are preferred because of their large aspect ratios in spite of their short lengths. For example, carbon fibers easily can have aspect ratios greater than 10:1 (L/W) and nanotubes can achieve such aspect ratios in spite of being an order of magnitude or more smaller in diameter than the carbon fibers.

If nanotubes are selected for use, single wall nanotubes are preferred to multiple-walled nanotubes.

Single-walled carbon nanotubes is an emerging technology that is preferred, such as those disclosed in U.S. Patent Publication 20030075682 (Colbert et al.).

Commercially available sources of carbon fibers and nanotubes currently include the Panex® carbon fiber product line of Zoltek Corporation of St. Louis, Mo., the Pyrograf-I™ multi-walled carbon nanotube product line of Nano Graphite Materials, Inc. of Cedarville, Ohio, and the single-walled carbon nanotube product line of Carbon Nanotechnologies, Inc. of Houston, Tex.

Inherently Conductive Polymer

Inherently conductive polymers suitable for the invention include polymers having repeating monomeric units of aniline, thiophene, pyrrole, phenyl mercaptan, and the like. Other examples include a conducting polymer selected from the group consisting of substituted and unsubstituted poly-paraphenylenevinylenes, substituted and unsubstituted polyanilines, substituted and unsubstituted polyazines, substituted and unsubstituted polythiophenes, substituted and unsubstituted polyparaphenylenes, substituted and unsubstituted poly-p-phenylene sulfides, substituted and unsubstituted polyfuranes, substituted and unsubstituted polypyrroles, substituted and unsubstituted polyselenophene, substituted and unsubstituted polyacetylenes, mixtures thereof, and copolymers thereof. These conductive polymers are disclosed in a variety of patents, including U.S. Pat. Nos. 5,069,820 (Jen et al.); 5,160,457 (Elsenbaumer); 5,185,100 (Han et al.); 5,281,363 (Shacklette et al.); 5,378,403 (Shacklette); 5,422,423 (Shacklette et al.); 5,456,862 (Kwan-Yue et al.); 5,567,355 (Wessling et al.); 5,700,398 (Angelopoulos et al.) and 5,911,918 (Shacklette et al.). As described in these patents, the inherently conductive polymer is often doped with an acid such as hydrochloric acid or p-toluene sulfonic acid.

Preferably, the inherently conductive polymer is a particle capable of dispersion into the carrier/binder.

Alternatively, one can use a graft of polyaniline and an acid. "Polyaniline-grafted-lignosulfonic acid" means a lignin moiety having both sulfonic acid chains and polyaniline chains grafted thereto. Polyaniline-grafted-lignosulfonic acid is disclosed in U.S. Pat. No. 5,968,417 (Viswanathan). Polyaniline-grafted-lignosulfonic acid is marketed by PolyOne Corporation as Teslart™ inherently conductive polymers and previously by GeoTech Chemical Company LLC as Ligno-PANi™ polymer.

While it is less likely that one skilled in the art would desire to use more than one inherently conductive polymer due to cost considerations, it is possible to mix two or more inherently conductive polymers.

Process

The preparation of compounds of the present invention is uncomplicated, particularly when the preparation is satisfied by a mixing of coatable materials. Mixing in an attritor is sufficient to thoroughly mix a pre-blend of inherently conductive polymer and metallic particles, followed by mixing of that pre-blend into a carrier/binder, conventionally a paint, using a paint mixer. The mixing speeds range from 600 to 1000 rpm and temperature of mixing can be ambient.

Conveniently for distribution, the pre-mixed blend of inherently conductive polymer and metallic particles can be kept separate from the carrier/binder until the time of application to a metal surface. Thus, it is another aspect of the present invention to have a solid concentrate consisting essentially of a blend of inherently conductive polymer particles and metallic particles. Consistent with the goal of using a minimum effective amount of inherently conductive polymer with an effective amount of anodic metal particles, one can make the concentrate to have less than 5 weight percent of inherently conductive polymer particles and more than 95 weight percent of the anodic metal particles, which is consistent with the ratio of less than 1 weight percent of inherently conductive polymer to less than 20 weight percent of anodic metal particles. Lower concentrations of inherently conductive polymer relative to anodic metal particles will increase that ratio of effectiveness, as seen in the Examples below.

Usefulness of the Invention

Cathodic protection compounds of the present invention can protect metal substrates such as iron, aluminum and other metal substrates where the metal of the substrate is more noble than the metallic particles of the coating. It does not matter whether the metal substrates have been protected by conversion coatings, phosphate treatments, etc.

The selection of the coating binder/carrier as the flowable material to make coatings of the present invention should be done considering good adhesion of the coating to the metal substrate. Some examples of the coating systems that have been successfully used in conjunction with inherently conductive polymer and metallic parties are acrylic, urethane, epoxy and alkyd. Also, water-based, solvent-based as well as 100% solids can provide cathodic protection to metal substrates.

Additional features of the invention are found in the following Examples.

EXAMPLES

Table 2 shows the ingredients used in the coatings and their commercial sources. Table 3 has three sections: Recipes for Examples 1-4 and Comparison Examples A-C; Preparation of such Examples; and Resulting Properties when applied to a mild steel panel serving as the metal substrate to be protected according to ASTM Test D117.

The salt spray data results, derived according to the ASTM test by visual inspection, are reinforced by the digital images of the coated metal substrates which were the subject of the visual comparison on the unscored (field) surface and at the scored region of each coated metal substrate.

Figure 4:
FIG. 4 a digital image of a sample of Comparison Example B.
Figure 7:
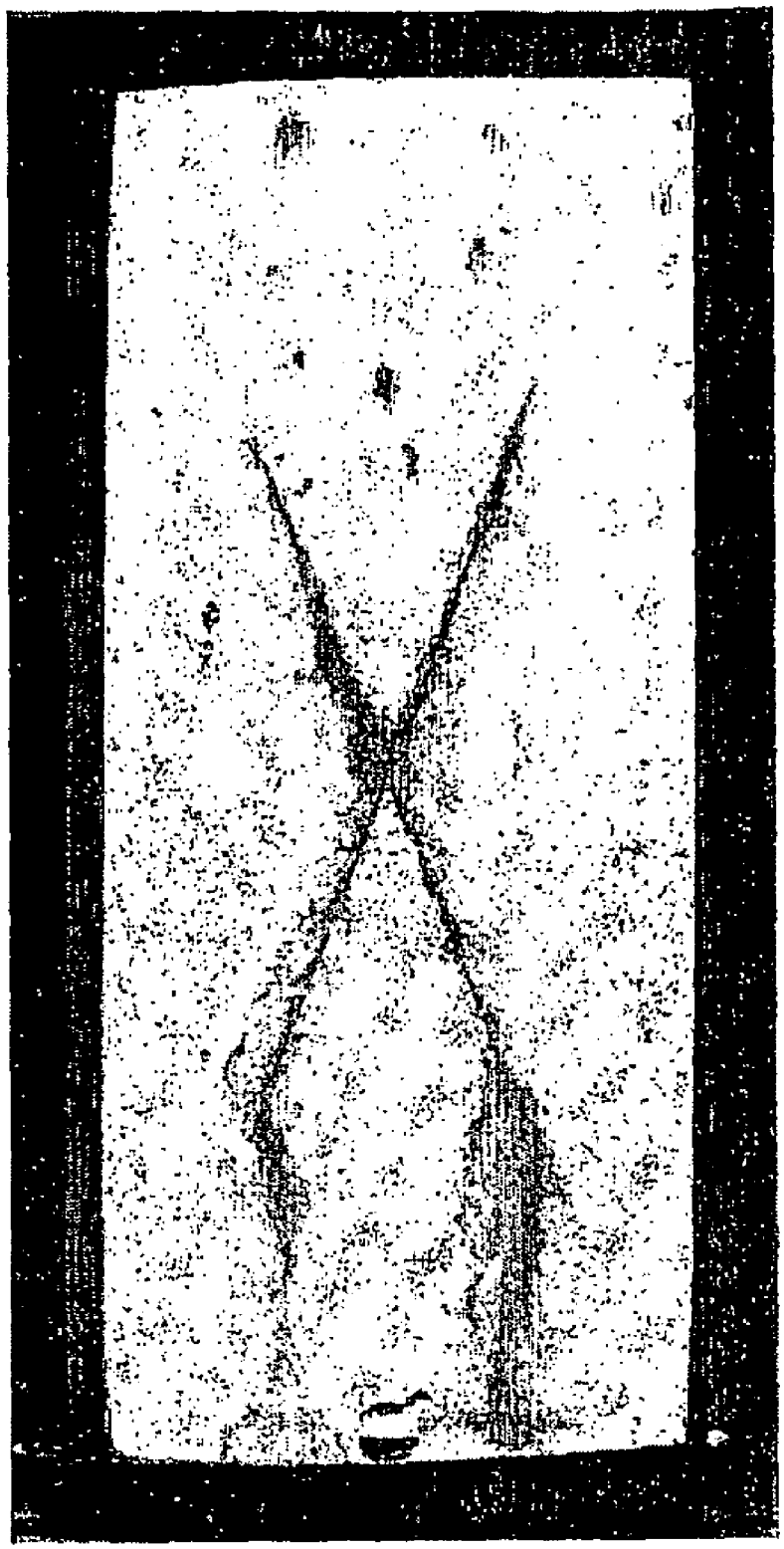
FIG. 7 a digital image of a sample of Example 4.

FIGS. 1-7 demonstrate the considerable and unexpected utility of the present invention, associated with Comparative Example A, Example 1, Example 2, Comparison Example B, Example 3, Comparison Example C, and Example 4, respectively.

TABLE 2

Source of Ingredients

| Ingredient Name | Purpose | Brand Name | Generic Name | Commercial Source | Source Location |
| --- | --- | --- | --- | --- | --- |
| Primer 5281 | Carrier/Binder | Rustoleum ™ Primer 5281 | Water-based acrylic primer (47.5% Solids, Remainder Water and Other Volatiles) | RPM Industries | Medina, OH |
| Zn Powder - 5 micron | sacrificial metal/ electron donor | PZM Zinc Dust | 5 micron zinc powder | Purity Zinc Metals LLC | Clarksville, TN |
| Al Powder - 5 micron | sacrificial metal/ electron donor | | 5 micron aluminum powder | Eckart, Inc. | Painesville, OH |
| Teslart ICP | ICP/Electron transfer agent | Teslart ™ | Polyaniline chains grafted to lignosulfonic acid | PolyOne Corp. | Avon Lake, OH |

TABLE 3

Recipes, Preparation, and Properties

| Example | Comparison Example A | 1 | 2 | Comparison Example B | 3 | Comparison Example C | 4 |
| --- | --- | --- | --- | --- | --- | --- | --- |
| Ingredient Name | Weight Percent of Solids + Liquids ("% of TS" means Weight Percent of Total Solids of the Compound) | | | | | | |
| Primer 5281 | 100% - % of TS = 100% | 97.09% - % of TS = 94.06% | 89.29% - % of TS = 79.83% | 89.29% - % of TS = 79.83% | 89.29% - % of TS = 79.83% | 89.29% - % of TS = 79.83% | 97.09% - % of TS = 94.06% |
| Zn Powder - 5 micron | 0% | 2.84% - % of TS = 5.79% | 10.45% - % of TS = 19.66% | 10.18% - % of TS = 19.16% | 0% | 0% | 2.77% - % of TS = 5.644 |
| Al Powder - 5 micron | 0% | 0% | 0% | 0% | 10.45% - % of TS = 19.66% | 10.18% - % of TS = 19.16% | 0% |
| Teslart ICP | 0% | 0.0728% - % of TS = 0.1485% | 0.268% - % of TS = 0.504% | 0.536% - % of TS = 1.01% | 0.268% - % of TS = 0.504% | 0.536% - % of TS = 1.01% | 0.146% - % of TS = 0.297% |

TABLE 3-continued

Recipes, Preparation, and Properties

| Example | Comparison Example A | 1 | 2 | Comparison Example B | 3 | Comparison Example C | 4 |
|---|---|---|---|---|---|---|---|
| | | | Preparation | | | | |
| Order of Addition of Ingredients | None | colspan=6: Pre-blend metal powder and Teslart ICP in an attritor at 1000 rpm at ambient temperature. Then mix that pre-blend into Primer 5281 with a paint mixer at 600 rpm at ambient temperature. | | | | | |
| Form of Product | Liquid for coating metallic substrates | colspan=6: Liquid for coating metallic substrates | | | | | |
| | | | Properties | | | | |
| ASTM D117 | Salt Spray, 250 hours, (FIG. 1) | Salt Spray, 360 hours, (FIG. 2) | Salt Spray, 360 hours, (FIG. 3) | Salt Spray, 360 hours, (FIG. 4) | Salt Spray, 340 hours, (FIG. 5) | Salt Spray, 340 hours, (FIG. 6) | Salt Spray, 360 hours (FIG. 7) |
| Field Corrosion Rating 1-10 (10 = least corrosion) | 0.0 | 7.0 | 9.5 | 5.0 | 6.0 | 2.0 | 7.0 |
| Scribe Corrosion Rating 1-10 (10 = least corrosion) | 2.0 | 7.0 | 10.0 | 8.0 | 8.0 | 7.0 | 8.0 |

Examples 1-4 show that the performance of the compound of the present invention improves markedly, and unexpectedly, as the solids content of inherently conductive polymer is reduced below 1 weight percent of the total solids content of the compound. A comparison of Example 2 to Comparison Example B and a comparison of Example 3 to Comparison Example C show that one-half the amount of inherently conductive actually improves the overall performance of the corrosion protection, with the total solids of metal particles employed remaining constant.

Also, Examples 1 and 4 show that even lower amounts of the inherently conductive polymer improves the cost of the compound without seriously diminishing the performance of the compound to protect metal surfaces.

Based on these Examples 1-4, it is possible to state that the weight ratio of total solids of inherently conductive polymer to metal particles can range from about 20:1 to about 40:1 in the concentrate or in the final compound.

The invention is not limited to the above embodiments. The claims follow.

What is claimed is:

1. A cathodic protection compound to protect a metal substrate, comprising:
   (a) inherently conductive polymer comprising polyaniline-grafted-lignosulfonic acid;
   (b) metal particles wherein the metal is less noble than metal of the metal substrate; and
   (c) binder,
   wherein the amount of inherently conductive polymer is less than 0.8 weight percent of total solids of the compound and wherein the amount of metal particles is less than 20 percent of the total solids of the compound.

2. The compound of claim 1, wherein the amount of inherently conductive polymer ranges from an electrically effective amount to less than 0.8 weight percent of total solids of the compound.

3. The compound of claim 1, wherein the amount of inherently conductive polymer ranges from 0.14 weight percent to 0.5 weight percent of total solids of the compound.

4. The compound of claim 1, wherein the metal particles have an average particle size ranging from about 1 μm to about 25 μm.

5. The compound of claim 1, wherein the metal substrate comprises iron and the metal particles are selected from the group consisting of zinc, aluminum, tin, and combinations thereof.

6. The compound of claim 1, wherein the binder is a flowable material.

7. The compound of claim 6, wherein the flowable material is electrically inactive.

8. The compound of claim 6, wherein the flowable material is electrically active.

9. The compound of claim 8, wherein the flowable material includes electrically active, galvanically inactive materials selected from the group consisting of carbon fibers, carbon particles, carbon nanotubes, and combinations thereof.

10. The compound of claim 1, wherein the weight ratio of total solids of inherently conductive polymer to metal particles can range from about 20:1 to about 40:1.

11. A method of using a cathodic protection compound for a metal substrate, comprising the steps of:
   (a) selecting a cathodic protection compound of claim 1, wherein the metal particles are less noble than metal of the metal substrate, and
   (b) applying the cathodic protection compound to the metal substrate.

* * * * *